(12) United States Patent  
Leonard et al.

(10) Patent No.: US 11,836,979 B2  
(45) Date of Patent: Dec. 5, 2023

(54) METHOD FOR DEPLOYING, CREATING AND CERTIFYING VIRTUAL PRESENCE

(71) Applicants: Jon N. Leonard, Oro Valley, AZ (US); David LaMountain, Coventry, RI (US)

(72) Inventors: Jon N. Leonard, Oro Valley, AZ (US); David LaMountain, Coventry, RI (US)

(73) Assignee: ARKNET INC., Oro Valley, AZ (US)

( * ) Notice: Subject to any disclaimer, the term of this patent is extended or adjusted under 35 U.S.C. 154(b) by 0 days.

(21) Appl. No.: 17/474,580

(22) Filed: Sep. 14, 2021

(65) Prior Publication Data

US 2022/0083779 A1 Mar. 17, 2022

Related U.S. Application Data

(60) Provisional application No. 63/078,244, filed on Sep. 14, 2020.

(51) Int. Cl.
*H04L 9/32* (2006.01)
*G06V 20/20* (2022.01)
(Continued)

(52) U.S. Cl.
CPC .............. *G06V 20/20* (2022.01); *G06F 3/011* (2013.01); *G06V 40/20* (2022.01); *H04L 9/3236* (2013.01);
(Continued)

(58) Field of Classification Search
CPC ...... H04W 76/14; H04W 12/06; H04L 9/3236
See application file for complete search history.

(56) References Cited

U.S. PATENT DOCUMENTS 6,292,713 B1   9/2001  Jouppi et al.
8,463,435 B2   6/2013  Herzog et al.
(Continued)

*Primary Examiner* — Viet D Vu
(74) *Attorney, Agent, or Firm* — BACON&THOMAS, PLLC

(57) ABSTRACT

A method and system of deploying, creating and certifying the "virtual presence" of a user at a location other than the actual location of the user that verifiably associates a power of attorney or agency contract and a "representing entity" to (1) establish the authority of a "representing entity" to act as if the user were physically present at the remote location, and (2) submit the "representing entity" to the jurisdiction of the remote location, even though the user is at a different location and only virtually "present" at the remote location. The representing entity could be an animate object or device located at the remote location, such as a robot, drone, or vehicle, or a "presence" that only exists electronically, commonly referred to as an "avatar." Certification of the virtual presence is achieved by associating a unique identifier of the representing entity with a certifying document or record that includes a power of attorney or agency contract that identifies both authorized actions by the representing entity and restrictions based on the jurisdiction in which the representing entity is empowered to act, and recording the certifying document or record by hashing and encrypting the unique identifier and document, storing the certifying document or record in a blockchain ledger, and/or storing the certifying document or record in a trusted and protected database.

10 Claims, 1 Drawing Sheet

(51) Int. Cl.
*G06F 3/01* (2006.01)
*H04W 76/14* (2018.01)
*H04W 12/06* (2021.01)
*G06V 40/20* (2022.01)
*H04L 9/00* (2022.01)

(52) U.S. Cl.
CPC ........... *H04W 12/06* (2013.01); *H04W 76/14* (2018.02); *H04L 9/50* (2022.05)

(56) References Cited

U.S. PATENT DOCUMENTS

| | | | |
|---|---|---|---|
| 8,938,681 B2 | 1/2015 | Dawson et al. | |
| 8,994,776 B2 | 3/2015 | Sutherland et al. | |
| 9,014,963 B1* | 4/2015 | Kolton | G06Q 30/02 |
| | | | 701/300 |
| 9,531,724 B2 | 12/2016 | Shuster et al. | |
| 9,601,022 B2 | 3/2017 | Taveira | |
| 9,601,502 B2 | 3/2017 | Sano et al. | |
| 9,610,502 B2 | 4/2017 | Hamilton et al. | |
| 9,626,826 B2 | 4/2017 | Nguyen | |
| 2005/0197818 A1* | 9/2005 | Monfared | G05B 19/042 |
| | | | 703/21 |
| 2007/0130456 A1* | 6/2007 | Kuo | H04W 12/06 |
| | | | 713/168 |
| 2009/0013263 A1* | 1/2009 | Fortnow | G06Q 10/10 |
| | | | 715/753 |
| 2015/0190927 A1* | 7/2015 | Sutherland | B25J 5/007 |
| | | | 901/1 |
| 2017/0060888 A1* | 3/2017 | Al Hassanat | H04W 4/029 |
| 2018/0342007 A1* | 11/2018 | Brannigan | G06Q 30/0643 |
| 2019/0373015 A1 | 12/2019 | Kozloski et al. | |

\* cited by examiner

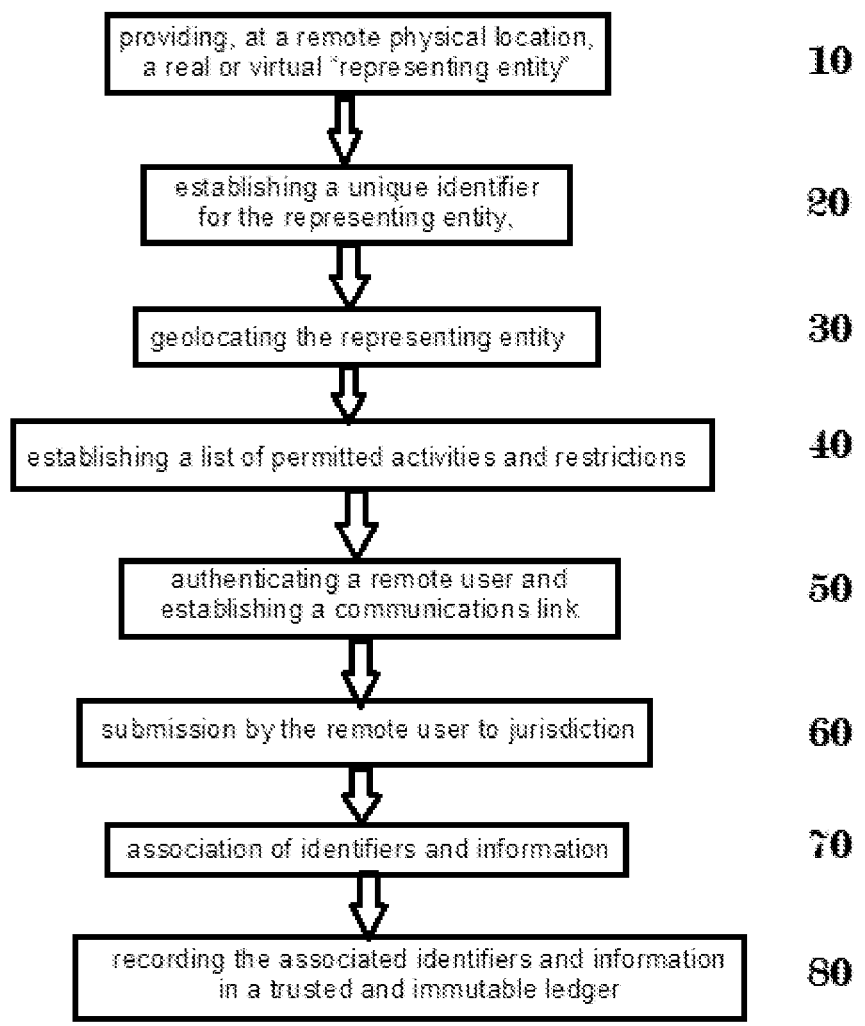

METHOD FOR DEPLOYING, CREATING AND CERTIFYING VIRTUAL PRESENCE

This application claims the benefit of U.S. Provisional Appl. Ser. No. 63/078,244, filed Sep. 17, 2020, and incorporated herein by reference.

BACKGROUND OF THE INVENTION

1. Field of the Invention

The current invention relates to a method of deploying, creating and certifying the "virtual presence" of a user at a location other than the actual location of the user, i.e., of verifiably associating a power of attorney or agency contract with a "representing entity" to (1) establish the authority of a "representing entity" to act as if the user were physically present at the remote location, and (2) submit the "representing entity" to the jurisdiction of the remote location, even though the user is at a different location and only virtually "present" at the remote location.

The representing entity could be an animate object or device located at the remote location, such as a robot, drone, or vehicle, or a "presence" that only exists electronically, commonly referred to as an "avatar."

Certification of the virtual presence is achieved by associating a unique identifier of the representing entity with a certifying document or record that includes a power of attorney or agency contract that defines both authorized actions by the representing entity and restrictions based on the jurisdiction in which the representing entity is empowered to act, and recording the certifying document or record in a inalterable ledger by hashing and encrypting the unique identifier and document, storing the certifying document or record in a blockchain ledger, and/or storing the certifying document or record in a trusted and protected database.

2. Description of Related Art

For quite some time the world as a whole has been moving steadily towards virtual. This advancement has been multiplied many fold by the current Covid-19 crisis which has spawned everything from virtual town meetings to virtual classrooms to virtual court houses. This spread of virtual interaction will continue to even more venues as technology such as AR, VR, Mixed AR/VR, and holograms roll out.

Virtual interaction has brought a tsunami of change across today's human interactions. Moreover, it is not just necessary for a person to participate in meetings without being present—it is also necessary for the person to execute agreements, certify documents, and so forth. This has typically been done by a human representative or proxy acting for the person in the jurisdiction where the actions are performed. However, there is an increasing need to allow the remotely-located person or principal to act at any time as a "virtual presence," without the need to recruit an independently-acting local human representative or proxy, i.e., to allow the person to contractually and lawfully do whatever he or she could do if present in the flesh at the remote location. Remote virtual presence is at the forefront of the empowerment of virtual interaction in today's world.

Of course, it is not only necessary to facilitate "virtual presence," but to ensure that the virtual presence is used properly. Limiting the ability of the remote person to act is just as important as empowering action. By way of example, if a person in Rhode Island were to hack into a bank In California in a virtual way, that person would be breaking laws in California without going there physically. This consideration shows that remote virtual responsibility is fundamentally inherent in virtual interaction, and making the current ballooning of our virtual interaction contractually and legally effective and frictionless is a fundamental and essential need that is largely unmet.

Effective remote virtual presence requires the ability to teleport a certified authorization to act from a person's current geolocation and jurisdiction to a remote geolocation and jurisdiction across the country or around the world. The authority to act is given over to a "representing entity" bestowed with the limited power of attorney to act on the person's behalf as if the principal were there. The principal acts as if it were in the physical location and abides by the laws and regulations therein.

One application for a certifiable virtual presence of the type deployed and created by the present invention is in the world of online gaming: a person in Virginia certifies his or her virtual presence in the State of Washington and not only visits one of their casinos but engages in gambling activity as if he were physically there. The certifiable virtual presence allows the person in Virginia to perform any action permitted under the rules and regulations of Washington State, while also subjecting the person to those rules and regulations.

While there are a number of patents and publications directed to establishing rights to act at a virtual location, including patents related to casino gambling, being authorized to act at a virtual location in a virtual universe is not the same as being able to act under, and being subject to, the rules and regulations of an actual location on earth. The right to act in a virtual gambling universe generally depends on the rules and regulations at the location in which the user is located. For example, use of a sports betting app in Virginia is subject to the rules and regulations applicable in Virginia, and does not allow the bettor to act as if the bettor were virtually present at a Northern Quest gambling casino in Washington State. Similarly, a gamer might be granted rights to act in a completely virtual gaming universe, subject to the rules and regulations of the virtual gaming universe, and may even be limited by the user's current "location" in that virtual gaming universe. Such virtual universe authenticating and authorizing methods, while useful for gamers and some gamblers, does not enable a user to act or interact with others as if the user were present at a remote location in the real world.

An example of a system and method in which the authority to act is based on the physical location of the user rather than the virtual presence at a location remote from the user is found in U.S. Pat. No. 9,601,502, which is directed to a "method for authenticating and authorizing a user within a virtual universe," in which a user in McLean, Virginia might be permitted to access data in the virtual universe, while a user in China might not. The method disclosed in this patent does not enable the user in McLean or China to certify his or her presence in Nevada and be able to perform any act permitted of a person actually present in Nevada (such as gambling). The reason is that the actions authorized are actions in a VU space that does not represent the remote location, but is merely "hosted" there. Certifying the actions of an avatar in a gambling app or game hosted in Washington is the not the same as certifying the "presence" of the avatar in Washington.

There is currently no way for the user in McLean, Virginia to remotely operate a vehicle in Redmond, Washington, or to attend, speak at, and vote at a shareholder's meeting in Redmond (for example, through a robot or avatar) rather than through a human proxy.

Other patents involving rights to participate in different activities in a complete virtual universe untied to any physical location, based on the status and actual location of the user include U.S. Pat. No. 9,531,724, which limits access based on the status of the user to part of the virtual universe (such as, by way of example, access by a child to a "red light district" in the virtual universe), and U.S. Pat. No. 9,626,826, which concerns authentication of mobile user to establish access rights to casino gambling.

Those skilled in the art will appreciate that the concept of remotely controlling devices, which may be utilized by the present invention, is well known, and a number of patents are directed to establishing authority to control the devices. For example, the above-mentioned Virginia user might be granted access to a wind turbine inspecting drone in Washington State. To ensure that the drone is not improperly used, the user in Virginia must be authenticated. The present invention also may involve remote control of a device, but simply authenticating the user in order to establish access rights is not the same as establishing a virtual presence in the remote location, and submitting to the rules and regulations of the jurisdiction that encompasses the remote location. An example of a system for authenticating a remote user of a robot to establish access rights is found in U.S. Pat. No. 8,994,776.

The present invention may also utilize blockchain technology as a way enable verification of the rights and limitations associated with a certified "virtual presence." It is of course known to use blockchain to ensure the authenticity of a document that specifies rights, including rights to take action or move around in a virtual world, such as the ones described in U.S. Pat. No. 9,610,502, which is primarily directed to "movement" of avatars in an entirely virtual world, and U.S. Patent Publication No. 2019/0373015, teaches using blockchain as the ledger for tracking and recording transactions and permissions in a completely virtual universe.

By way of additional background: U.S. Pat. No. 8,938,681 is directed to the management of so-called "teleportation movements" in an entirely virtual universe, without reference to actual geographic locations, and in particular to the authorization of an entity to teleport to particular locations in the virtual universe based on user-associated metadata filtering. In addition, U.S. Pat. No. 6,292,713 discloses a virtual presence robot controlled through a PC by a user at a remote geographic, without authentication of access limitations; U.S. Pat. No. 8,463,435 is directed to a virtual presence robot, including a mechanism for determining access priority based on user IDs, and U.S. Pat. No. 9,601,022 discloses a system for restricting use of a drone, but based on drone identification and credentials rather than on the identity and credential of a remote operator of the drone. Finally, the following hyperlinks provide background on telepresence robots and "virtual presence" by video conference: https://telepresencerobots.com and https://arielgroup.com/programs/virtual-presence.

SUMMARY OF THE INVENTION

It is accordingly a first objective of the invention to provide a way to empower a person to act or conduct business at a remote location through a representative entity, as if the person were present at the remote location and subject to the rules and regulations of the jurisdiction that encompasses the remote location rather than the jurisdiction in which the person is actually present.

It is a second objective of the invention to provide a method and system for deploying, creating and certifying the "virtual presence" of a user at a location other than the actual location of the user, wherein the location is a real world location as opposed to a location that exists solely in a virtual universe hosted at a particular location.

It is a third objective of the invention to provide a method and system of verifiably associating a power of attorney or agency contract with a "representing entity" to (1) establish the authority of a "representing entity" to act as if the user were physically present at the remote location, and (2) submit the "representing entity" to the jurisdiction of the remote location, even though the user is at a different location and only virtually "present" at the remote location.

These and other objectives are achieved, in accordance with preferred embodiments of the invention, by a system and method in which an effective remote virtual presence is established by teleporting a certified authority to act from a person's current geolocation and jurisdiction to a remote geolocation and jurisdiction across the country or around the world. The authority to act is given over to a "representing entity" bestowed with a limited power of attorney or agency contract that enables the representing entity to act as if the person were there, and requires the representing entity to abide by the laws and regulations of the location in which the representing entity is present.

In a preferred embodiment of the invention, a method or system of certifying the presence of a user at a remote physical location so that the user has all of the rights, privileges, and responsibilities of a person who is actually at the location, includes or executes the steps of:

providing, at the remote physical location, a real or virtual "representing entity" capable of being uniquely identified and of carrying out activities at the remote physical location;

establishing a unique identifier for the representing entity, determining the geolocation or coordinates of the representing entity, an itinerary or movement boundaries if the representing entity is mobile, and jurisdictions in which the representing entity may act;

establishing a list of permitted activities and restrictions, including jurisdictional restrictions, i.e., rules and regulations, that apply to the permitted activities;

authenticating a remote user and establishing a communications link by which the remote user can control the representing entity to perform the permitted activities;

providing a mechanism by which the remote user affirms or submits to the jurisdiction or jurisdictions in which the representing entity is location;

associating the unique identifier of the representing entity, authorized user identification information or indicia, submission to or affirmation of jurisdiction, and an agency agreement in the form of a document or record of the permitted activities, restrictions, and location information; and recording the associated representing entity identifier, authorized user identification information or indicia, and agency agreement in a certificate, blockchain record, or any other trusted and/or immutable database.

The method and system of the invention not only grants power of attorney or agency to a representing entity that serves as a proxy for the user at a remote physical location, but also can be used to confer other rights and privileges associated with presence at the remote physical location, and submits the representing entity acting on behalf of the remote user to the jurisdiction of the laws and regulations that apply at the remote physical location. In addition, the invention provides for authentication of the remotely-located user to ensure that the remote user is not an imposter, and that the remote user's appearance in the jurisdiction is not attributable to a "deep fake" or other deception.

The representing entity may, in the exemplary embodiments of the invention, take a wide variety of forms, including a software bot, image, icon, hologram, augmented reality object, or avatar viewable on a display screen, or a machine, robot, drone, vehicle, or other piece of equipment.

The authority to act could be power of attorney, smart contract or any other agreement subject to certification, and the certification could be recorded on a digital certificate created by hashing and encrypting the included information, a blockchain ledger, or any other trusted and immutable database. By trusted and immutable database is meant any tamperproof database in which the included information cannot be changed, at least for a period of time, whether by encryption, the laws of physics, governmental authority, or an army.

BRIEF DESCRIPTION OF THE DRAWINGS

FIG. 1 is a flowchart illustrating the process of transporting a certified authority to act from a person's current geolocation and jurisdiction to a remote geolocation and jurisdiction.

DETAILED DESCRIPTION OF THE PREFERRED EMBODIMENTS

As illustrated in FIG. 1, a method or system of establishing authority for a user to act through a representing entity at a remote location includes, carries out, performs, or executes the following steps:

First, it is necessary to provide, designate, or select a representative entity, as indicated by step 10. The representative entity can be a virtual object, such as a software bot, image, icon, hologram, augmented reality object, or avatar viewable on a display screen, or a physical device, such as a machine, robot, drone, vehicle, or any other piece of equipment, capable of performing some action on behalf of and/or other the control of the remote user. The action may consist of speaking or voting on behalf of the remote person, for example to represent the remote person at a shareholder's meeting without the need for a human proxy, in which case the representing entity can be an avatar with speech capabilities. Similarly, the representing entity may act as an attorney in court proceedings that do not require a local attorney. Alternatively, the action may be inspection of a pipeline or wind turbine, in which case the representing entity might be a drone, or the action may be gambling, in which case the representing entity may be a robot seated at a blackjack table.

The above examples are only a few of the possible actions that might be carried out on a representative basis by a person located at a remote location, and therefore there is no limit as to the type or nature of representing entities, other than that the representing entity must be uniquely identifiable. The unique identification, established in step 20, may be a number, code, VIN, or any other identifier that can be expressed in digital form or computer code. The step of establishing the identifier may include capturing the identifier via a bar code reader, inputting a pre-assigned identifier, reading a VIN or serial number, capturing an image of the representing entity if the representing entity has a unique appearance, and so forth.

In step 30, the method and system of the illustrated embodiment determines and/or identifies the location of the representing entity, or any information needed to establish the location of the representing entity, an itinerary or boundaries for movement of the representing entity if the representing entity is mobile (for example, a vehicle, drone, or robot), and the jurisdictions that include the location of the representing entity or the locations to which the representing entity may move. The jurisdictions may include multiple overlapping jurisdictions, such as a city, county, state, or country, and may also include non-public jurisdictions, i.e., private property such as a casino or convention center, or an industrial or agricultural facility.

In step 40, the exemplary method and system establishes an identification of permitted activities and restrictions for the representing entity. The restrictions may include jurisdictional restrictions, i.e., rules and regulations, that apply to the permitted activities, such as limitations as to movement, privacy considerations, safety rules, restrictions on bets or the subject matter of bets, and so forth. The permitted activities, as mentioned above, may include any activities that the representing entity is capable of performing, subject to restrictions, including inspections, gambling, participating in meetings, negotiations, and legal proceedings, and so forth.

Step 50, the step of establishing a communications link by which the remote user can control the representing entity and authenticating the remote user, can be carried out by conventional remote user authentication steps including registration of the remote user, establishing a unique digital signature, encrypting communications, dual-factor authentication, and so forth. The communications link can be an Internet connection, a direct cellular connection, a satellite link, or any other communications link that permits real time control of the representing entity.

At any time after a determination has been made as to the jurisdiction or jurisdictions in which the representing entity will act, the remote user must affirm acceptance of the authority of those jurisdictions over the remote user, despite the remote user's lack of actual presence in the jurisdiction(s). This submission or acceptance of jurisdiction is indicated by step 60, and may take a variety of forms, including a simple checkmark in a form, a witnessed declaration, and so forth.

In step 70, upon collection of all of the above-described information, including the unique identifier of the representing entity, authorized user identification information or indicia, and information on for example permitted activities, restrictions, and locations, a document or record is created that includes all of the information and that serves as an "agency agreement" (or power of attorney) that sets forth the conditions under which the representing entity may act on behalf of the remote user. The nature and format of the document or record will depend on the amount of information and the medium in which the document or record is to be recorded, and therefore is not to be limited to any particular format or type of document or record.

Finally, in step 80, the agency agreement and identifying information are recorded in an immutable ledger in a form that is accessible by anyone who needs to check the agreement. The rights and limitations may also be programmed into or otherwise impressed upon the representing entity, although it may also be left to the remote user to respect aspects of the agency agreement while controlling the representing entity, under threat of legal or punitive action by the jurisdiction to which the remote user has submitted.

Recording of the agency agreement and identifiers may involve the creation of a digital authentication certificate by hashing and encrypting the information, and/or recording the information in a blockchain ledger. However, it is also possible to ensure immutability of the agency agreement and identifying information by storing it in a database secured by means other than encryption or blockchain technology. In addition, there is no requirement that the ledger be permanent. It is only required that the recorded agency agreement and identifying information exist for as long as necessary to verify the virtual presence of the remote user. Once the virtual presence has been completed, the ledger may or may not be deleted or erased.

It will be appreciated that each of the determining, recording, identifying and other steps described above may be performed by equipment that includes one or more computers and/or processors programmed to carry out or facility the described steps. The equipment may include mobile devices or communications equipment, as well as appropriate software or programming, network interfaces, and so forth, as would be understood by those skilled in the appropriate art.

Although a specific example of a method and system for establishing and verifying virtual presence through a representing entity has been described, it will be appreciated that the invention is not to be limited to the disclosed example, and that the invention be limited solely by the appended claims.

What is claimed is:

1. A method of certifying the virtual presence of a user at a remote physical location so that the user, who is not physically present at the remote physical location, has all of the rights and privileges of a person who is actually physically present at the remote physical location, comprising the steps of:
   providing, at the remote physical location, a representing entity capable of being uniquely identified and of carrying out activities at the remote physical location; establishing a unique identifier for the representing entity,
   determining the geolocation or coordinates of the representing entity, an itinerary or movement boundaries if the representing entity is mobile, and jurisdictions in which the representing entity may act;
   establishing permitted activities and restrictions, including jurisdictional restrictions, that apply to the permitted activities;
   authenticating a remote user and establishing a communications link by which the remote user can control the representing entity to perform the permitted activities;
   providing a mechanism by which the remote user affirms or submits to the jurisdiction or jurisdictions in which the representing entity is located;
   associating the unique identifier of the representing entity, authorized user identification information or indicia, submission to or affirmation of jurisdiction, and an agency agreement in the form of a document or record of the permitted activities, restrictions, and location information; and
   recording the associated representing entity identifier, authorized user identification information or indicia, and agency agreement in an at least temporarily immutable ledger.

2. A method as claimed in claim 1, wherein the representing entity is one of a software bot, virtual entity, or avatar visible on a display screen or audible to a listener at the location of the representing entity.

3. A method as claimed in claim 1, wherein the representing entity is a machine, a robot, a drone, a car, an aircraft, another piece of equipment.

4. A method as claimed in claim 1, wherein the at least temporarily immutable ledger is a digital certificate including, at least, an encrypted hash of the agency agreement and the unique identifier.

5. A method as claimed in claim 1, wherein the at least temporarily immutable ledger is a blockchain ledger.

6. A system for certifying the virtual presence of a user at a remote physical location so that the user, who is not physically present at the remote physical location, has all of the rights and privileges of a person who is actually physically present at the remote physical location, comprising:
   a representing entity situated at the remote physical location and capable of being uniquely identified and of carrying out activities at the remote physical location, wherein the representing entity is identifiable by a unique identifier, equipment for inputting or determining the following information:
   (a) an identification of the geolocation or coordinates of the representing entity, an itinerary or movement boundaries if the representing entity is mobile, and jurisdictions in which the representing entity may act;
   (b) an identification of permitted activities and restrictions, including jurisdictional restrictions, that apply to the permitted activities;
   equipment for authenticating a remote user and establishing a communications link by which the remote user can control the representing entity to perform the permitted activities;
   a mechanism by which the remote user affirms or submits to the jurisdiction or jurisdictions in which the representing entity is location;
   equipment for associating the unique identifier of the representing entity, authorized user identification information or indicia, submission to or affirmation of jurisdiction, and an agency agreement in the form of a document or record of the permitted activities, restrictions, and location information; and
   equipment for recording the associated representing entity identifier, authorized user identification information or indicia, and agency agreement in an at least temporarily immutable ledger.

7. A system as claimed in claim 6, wherein the representing entity is one of a software bot, virtual entity, or avatar visible on a display screen or audible to a listener at the location of the representing entity.

8. A system as claimed in claim 6, wherein the representing entity is a machine, a robot, a drone, a car, an aircraft, another piece of equipment.

9. A system as claimed in claim 6, wherein the at least temporarily immutable ledger is a digital certificate including, at least, an encrypted hash of the agency agreement and the unique identifier.

10. A system as claimed in claim 6, wherein the at least temporarily immutable ledger is a blockchain ledger.

* * * * *